United States Patent [19]

Sytwu

[11] Patent Number: 5,572,688
[45] Date of Patent: Nov. 5, 1996

[54] PRIMARY BUS PROCESSING ELEMENT WITH MULTIFUNCTION INTERCONNECTION TO SECONDARY BUS

[75] Inventor: James T. Sytwu, Los Altos, Calif.

[73] Assignee: Tyan Computer Corporation, Milpitas, Calif.

[21] Appl. No.: 315,979

[22] Filed: Sep. 30, 1994

[51] Int. Cl.⁶ ........................................ G06F 13/00
[52] U.S. Cl. ................ 395/309; 395/308; 395/281; 395/280; 364/240.2; 364/239.9; 364/DIG. 1
[58] Field of Search ............................ 395/281, 308, 395/309, 310, 280

[56] References Cited

U.S. PATENT DOCUMENTS

| | | | |
|---|---|---|---|
| 4,604,689 | 8/1986 | Burger | 364/200 |
| 4,647,123 | 3/1987 | Chin et al. | 339/17 |
| 4,683,550 | 7/1987 | Jindrick et al. | 364/900 |
| 4,885,482 | 12/1989 | Sharp et al. | 307/465 |
| 4,954,949 | 9/1990 | Rubin | 395/200.01 |
| 4,971,563 | 11/1990 | Wells, III | 439/61 |
| 5,006,961 | 4/1991 | Monico | 361/413 |
| 5,025,412 | 6/1991 | Dalrymple | 364/900 |
| 5,333,293 | 7/1994 | Bonella | 395/425 |
| 5,392,407 | 2/1995 | Heil et al. | 395/293 |
| 5,426,739 | 6/1995 | Lin et al. | 395/309 |
| 5,440,775 | 8/1995 | Harwer et al. | 395/800 |
| 5,446,868 | 8/1995 | Gardea, II et al. | 395/500 |
| 5,463,753 | 10/1995 | Fry et al. | 395/473 |
| 5,488,705 | 1/1996 | LaBarbera | 395/309 |
| 5,493,655 | 2/1996 | Shen et al. | 395/280 |
| 5,513,329 | 4/1996 | Pecone | 395/281 |

OTHER PUBLICATIONS

IDE Master 290 User's Manual, Tekran Technology, Taiwan, Publication Date Unknown.

Primary Examiner—Christopher B. Shin
Attorney, Agent, or Firm—Flehr, Hohbach, Test, Albritton & Herbert

[57] ABSTRACT

An apparatus to process signals within a computer that has a primary bus including a primary bus interconnection slot and a secondary bus including a secondary bus interconnection slot is described. The apparatus includes a primary bus card with a primary bus connector region for connection with the primary bus interconnection slot. The primary bus card includes a processing circuit electrically connected to the primary bus connector region to process primary bus signals from the primary bus. In addition, the primary bus card has a bridge cable connector electrically connected to the processing circuit. The invention also uses a secondary bus connector that is positionable within the secondary bus interconnection slot. The secondary bus connector has a vertical height substantially equivalent to the vertical height of the secondary bus interconnection slot. A bridge cable is connected between the bridge cable connector and the secondary bus connector to convey secondary bus signals from the secondary bus connector to the processing circuit.

20 Claims, 8 Drawing Sheets

| Left pin | # | Right pin |
|---|---|---|
| GND | 1 | IOCHK* |
| RSTDRV | 2 | SD7 |
| +5 Vdc | 3 | SD6 |
| IRQ0 | 4 | SD5 |
| −5 Vdc | 5 | SD4 |
| DREQ2 | 6 | SD3 |
| −12 Vdc | 7 | SD2 |
| NOWS* | 8 | SD1 |
| +12 Vdc | 9 | SD0 |
| GND | 10 | CHRDY |
| SMWTC* | 11 | AEN(1) |
| SMRDC* | 12 | SA19 |
| IOWC* | 13 | SA18 |
| IORC* | 14 | SA17 |
| DACK3* | 15 | SA16 |
| DREQ3 | 16 | SA15 |
| DACK1* | 17 | SA14 |
| DREQ1 | 18 | SA13 |
| REFRESH* | 19 | SA12 |
| SCLK | 20 | SA11 |
| IRQ7 | 21 | SA10 |
| IRQ6 | 22 | SA9 |
| IRQ5 | 23 | SA8 |
| IRQ4 | 24 | SA7 |
| IRQ3 | 25 | SA6 |
| DACK2* | 26 | SA5 |
| T−C | 27 | SA4 |
| BALE | 28 | SA3 |
| +5 Vdc | 29 | SA2 |
| OSC | 30 | SA1 |
| GND | 31 | SA0 |

SEE FIG. 7B

PRIMARY BUS PROCESSING ELEMENT WITH MULTIFUNCTION INTERCONNECTION TO SECONDARY BUS

BRIEF DESCRIPTION OF THE INVENTION

This invention relates generally to data buses in computers. More particularly, this invention describes a processing element connected to a primary bus, such as a Peripheral Component Interconnect (PCI) local bus, that includes a multifunction interconnection to a secondary bus, such as an Industry Standard Architecture (ISA) expansion bus.

BACKGROUND OF THE INVENTION

The different functional elements in a computer pass information by means of one or more data buses. The prevalent type of bus used in personal computers is the 16-bit wide expansion bus known as the Industry Standard Architecture (ISA) bus. The ISA bus has been expanded into a 32-bit wide bus known as the Extended Industry Standard Architecture (EISA) bus. As used herein, any reference to EISA is meant to include ISA, and vice versa.

Graphic-oriented operating systems, such as Windows™ and OS/2™, have created data bottlenecks between the processor and display peripherals in personal computers relying solely upon ISA or EISA buses. These bottlenecks can be reduced by moving peripheral functions with high bandwidth requirements closer to a system's processor bus. A Peripheral Component Interconnect (PCI) local bus is used for this purpose. The PCI local bus has resulted in substantial performance gains in connection with graphical user interfaces (GUIs) and other high bandwidth functions.

Figure 1:
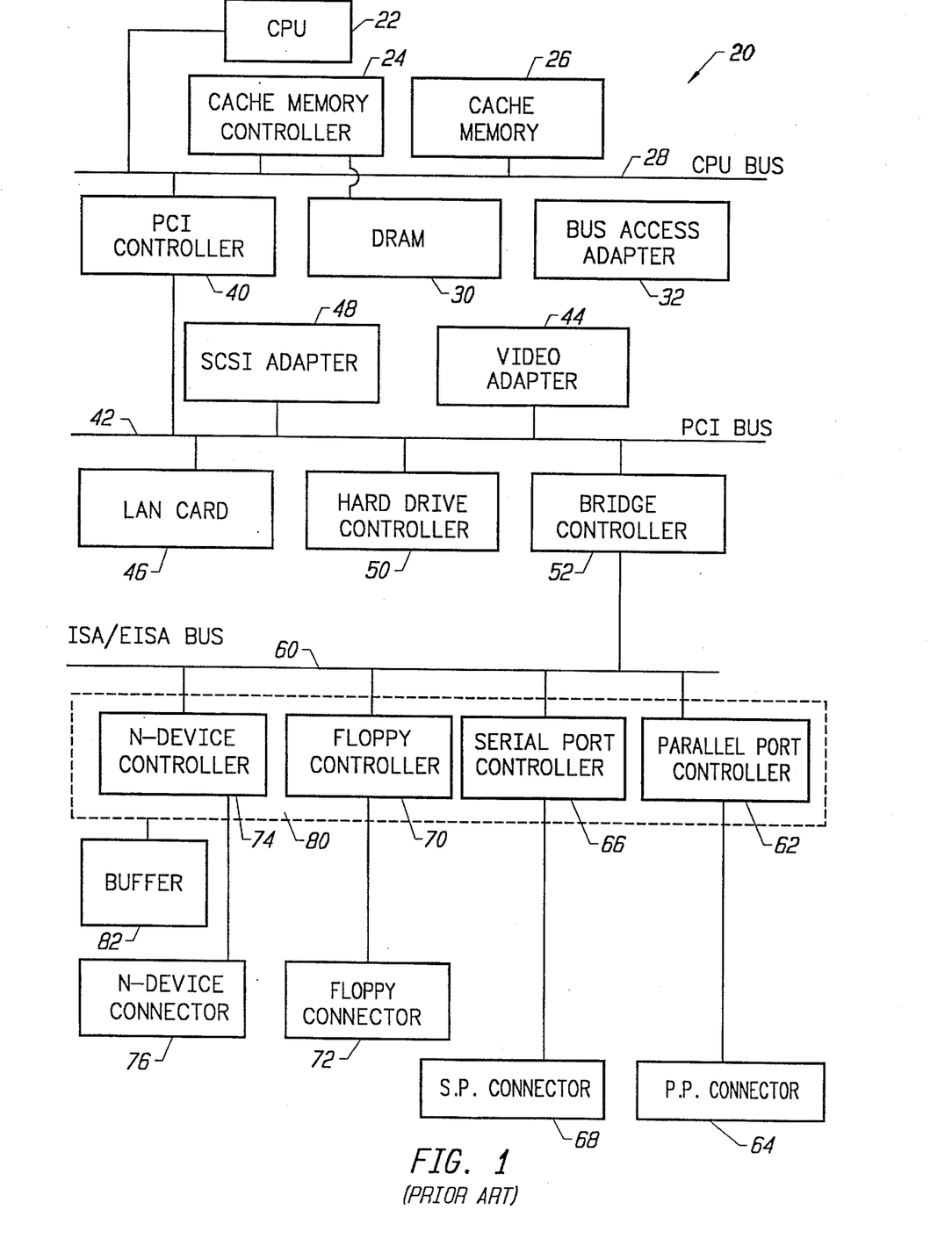
FIG. 1 is a schematic of a general purpose computer that includes a primary bus and a secondary bus.

FIG. 1 illustrates a general purpose computer 20 that incorporates both an ISA bus and a PCI bus. The computer 20 includes a Central Processing Unit (CPU) 22 that is connected to a CPU bus 28. A cache memory controller 24 controls a cache memory 26, which stores recent or frequently used data. The cache memory controller 24 is also connected to Dynamic Random Access Memory (DRAM) 30. The CPU bus 28 has a number of components connected to it. By way of example, FIG. 1 shows a bus access adapter 32, which allows additional components to be connected to the CPU bus 28. The CPU bus 28 is also connected to a PCI controller that serves as an interface between the CPU bus 28 and the PCI bus 42.

As indicated above, high bandwidth peripheral components are connected to the PCI bus 42. By way of example, FIG. 1 illustrates a video adapter 44, a Local Area Network (LAN) card 46, and a Small Computer System Interface (SCSI) adapter 48 connected to the PCI bus 42. When the PCI bus 42 was originally conceived, it was assumed that connections to hard disk drives would be made through the SCSI adapter 48. However, most computer manufacturers find it more economical to connect a hard disk drive through a hard drive controller 50, instead of through the SCSI adapter 48. The hard drive controller 50 may be implemented as an industry standard IDE/ATA controller.

The PCI local bus 42 also includes a bridge controller 52 that serves as an interface between the PCI bus and the ISA bus 60. Relatively low throughput peripheral devices are connected to the ISA bus 60. FIG. 1 illustrates a parallel port controller 62 connected to the ISA bus 60. The parallel port controller 62 is also connected to a parallel port connector 64 that is externally positioned on the outside of the housing (not shown) of the computer 20. The ISA bus 60 is also connected to a serial port controller 66 that is connected to an externally positioned serial port connector 68. FIG. 1 also illustrates that a floppy disk drive controller 70 may be connected to the ISA bus 60. The floppy controller 70 has a corresponding floppy connector 72 that is positioned within the housing of the computer 20. To indicate that a number of additional functional devices may be connected to the ISA bus 60, FIG. 1 illustrates an N-device controller 74 and a corresponding N-device connector 76. The N-device controller 74 may be a game controller, an additional serial port, etc.

The functional operations performed by the parallel port controller 62, the serial port controller 66, the floppy controller 70, and the N-device controller 74 may be integrated into a single input/output circuit 80, as indicated in FIG. 1. The single input/output circuit 80 may rely upon a buffer 82.

Figure 2:
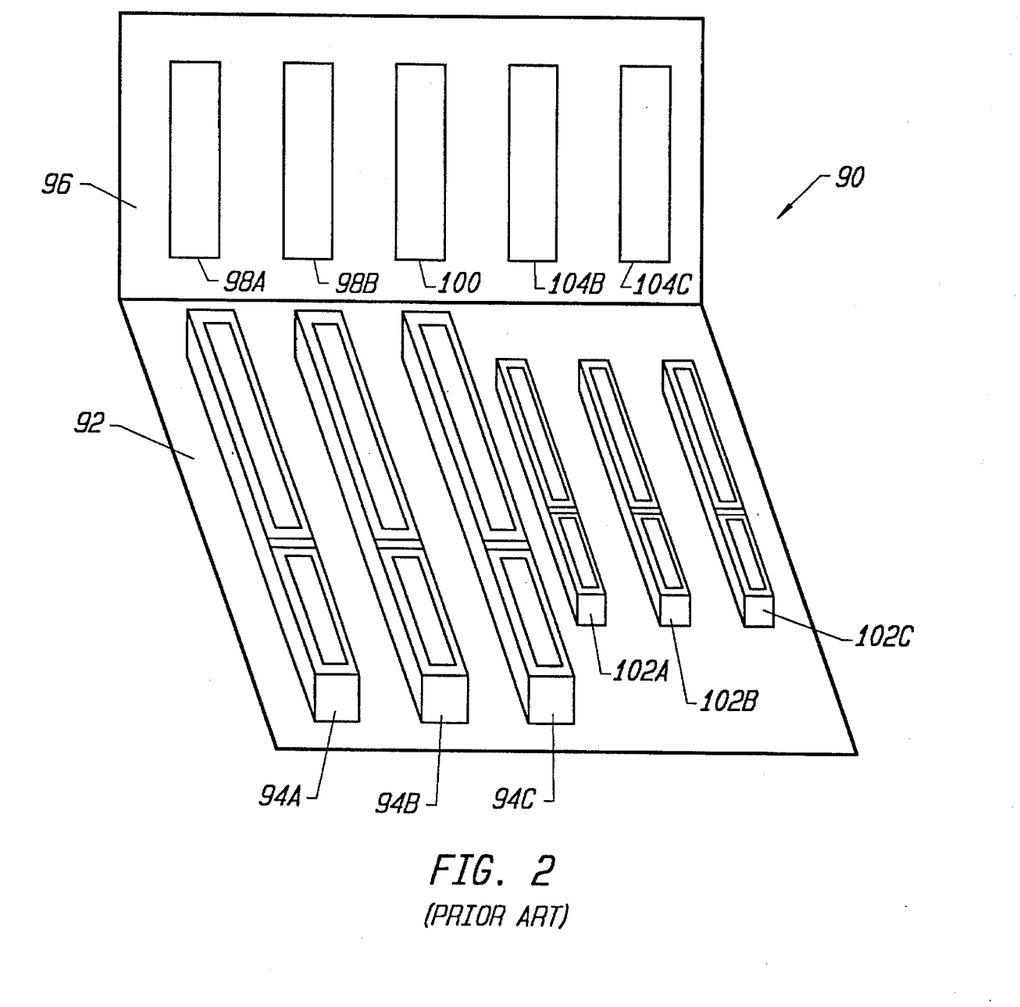
FIG. 2 is a perspective view of the motherboard and backplane of a general purpose computer.

FIG. 2 illustrates a portion of a computer housing 90. The housing 90 includes a motherboard 92 that supports a set of ISA slots 94A, 94B, and 94C. Each slot receives a controller card so that the controller card can make a connection to the ISA bus 60 (not shown in FIG. 2). For example, the parallel port controller 62 of FIG. 1 may be in the form of a card that fits into slot 94A.

The housing 90 also includes a back plane 96. The back plane 96 has a set of apertures corresponding to the slots of the mother board 92. For example, slot 94A has a corresponding backplane aperture 98A, while slot 94B has a corresponding backplane aperture 98B. Relying upon the previous example, if the parallel port controller 62 was positioned in slot 94A, then the parallel port connector 64 would be positioned within backplane aperture 98A.

The mother board 92 also supports a set of PCI slots 102A, 102B, and 102C. To obtain access to the PCI bus 42, PCI devices such as the hard drive controller 50 or the LAN card 46 are connected to the PCI slots 102A, 102B, or 102C. PCI slots 102B and 102C have corresponding backplane apertures 104B and 104C.

Note that ISA slot 94C and PCI slot 102A share a common backplane aperture 100. In addition, the standard spacing between these slots (0.8 of an inch) precludes the use of a card in both the ISA slot 94C and the PCI slot 102A. For this reason, the ISA slot 94C and the PCI slot 102A are commonly called a "shared slot". A shared slot is used to provide a maximum number of computer slots on a motherboard. Unfortunately, only one slot of the "shared slot" can be used in the prior art because of the spacing between the slots 94C and 102A, and the fact that there is only one backplane aperture 100.

In addition to the peripheral devices shown in FIG. 1, personal computer users also desire to connect additional peripheral devices to the PCI bus 42, and ISA bus 60. Additional devices include, tape backup units, CD-ROM drives, scanners, video cameras, MIDI devices, and magneto-optical drives. Thus, it can be appreciated that it would be highly desirable to be able to exploit each bus slot provided in a computer, including both slots of a "shared slot".

Another shortcoming of the architecture associated with prior art personal computers, as shown in FIGS. 1 and 2, is that the PCI bus 42 is designated to carry one set of signals, while the ISA bus 60 is designated to carry another set of signals. Consequently, in the prior art, it is not possible to integrate the operations performed by a device connected to the ISA bus 60 with the operations performed by a device connected to the PCI bus 42. It would be highly desirable to provide a single device to perform operations associated with both an ISA bus 60 and a PCI bus 42. By combining these operations, slot space could be used for other peripheral devices. In addition, a single device that processes signals from two buses is less expensive than two devices to perform the same function.

SUMMARY OF THE INVENTION

The invention is an apparatus to process signals within a computer that has a primary bus including a primary bus interconnection slot and a secondary bus including a secondary bus interconnection slot. The primary bus interconnection slot can be connected to an industry standard Peripheral Component Interconnect (PCI) computer bus, while the secondary bus interconnection slot can be connected to an Industry Standard Architecture (ISA) computer bus. In such a configuration, spacing restrictions prevent a processing card from being positioned in both the primary bus interconnection slot and the secondary bus interconnection slot. In order to avoid this problem, the invention includes a primary bus card with a primary bus connector region for connection with the primary bus interconnection slot. The primary bus card includes a processing circuit electrically connected to the primary bus connector region to process primary bus signals from the primary bus. In addition, the primary bus card has a bridge cable connector electrically connected to the processing circuit. The invention also uses a secondary bus connector that is positionable within the secondary bus interconnection slot. The secondary bus connector has a vertical height substantially equivalent to the vertical height of the secondary bus interconnection slot. Consequently, the secondary bus connector can be positioned next to the primary bus card. A bridge cable is connected between the bridge cable connector and the secondary bus connector to convey secondary bus signals from the secondary bus connector to the processing circuit. As a result, a single card is used to process signals from two computer buses. In addition, adjacent bus slots that could not be simultaneously used in the prior art are now available for simultaneous use.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 3:
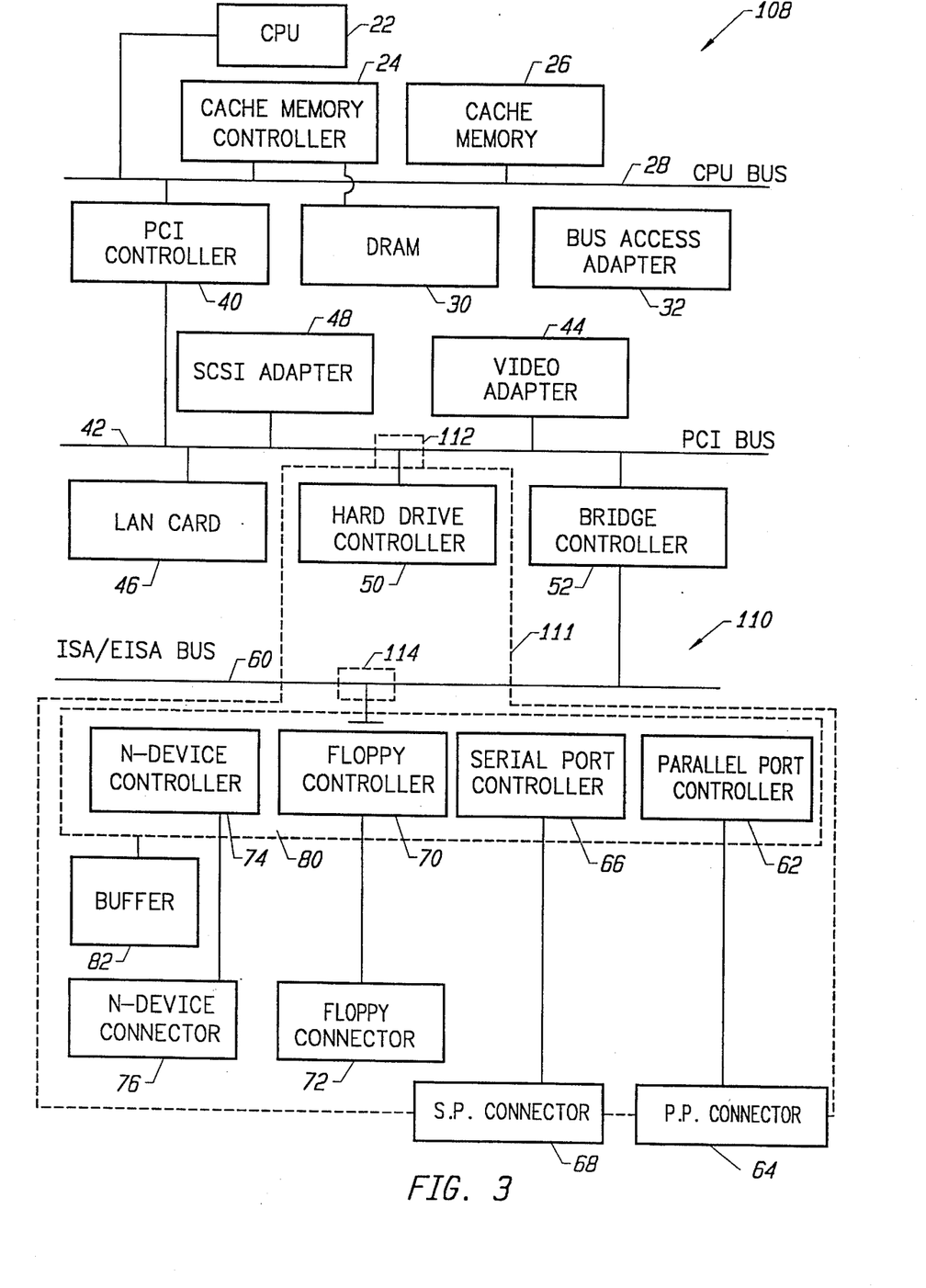
FIG. 3 is a schematic view of a general purpose computer that incorporates the multiple bus processing element of the invention.

FIG. 3 illustrates a general purpose computer 108 incorporating an embodiment of a multiple bus processing element 110 in accordance with the invention. The multiple bus processing element 110 includes a primary bus card 111 that includes a primary bus connector region 112. In this embodiment, the primary bus card 111 is connected to a PCI bus 42. The multiple bus processing element 110 also includes a secondary bus connector 114. In the embodiment of FIG. 3, the secondary bus connector 114 is for connection to an ISA bus. Thus, it can be appreciated that the apparatus 110 of the invention is a single board that processes signals from two distinct buses. In other words, the apparatus 110 of the invention provides a single device to process two sets of signals from two different buses. Signals from the PCI bus 42 are processed by the hard drive controller 50. Signals from the ISA bus 60 are processed by the input/output circuit 80.

Figure 4:
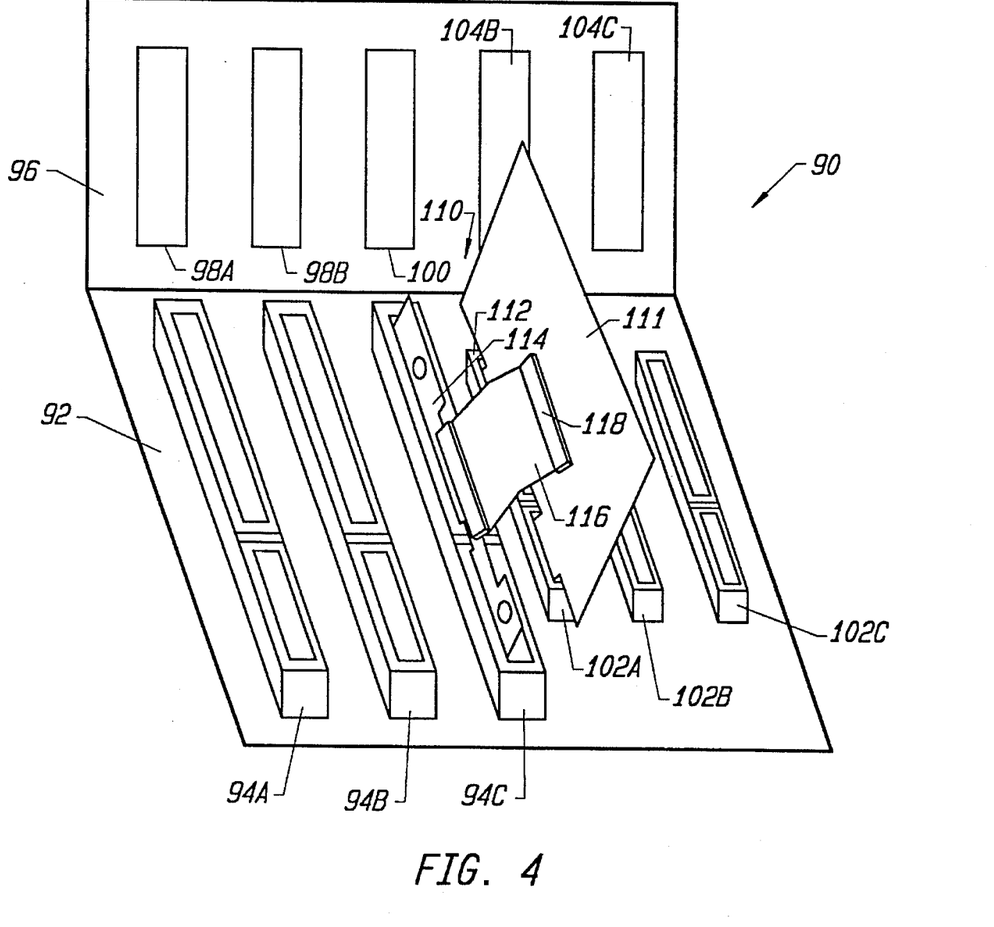
FIG. 4 is a perspective view of the multiple bus processing element of the invention.

The technique to obtain the dual bus connection associated with the invention is illustrated in FIG. 4. FIG. 4 illustrates the multiple bus processing element 110 of the invention positioned within PCI slot 102A via primary bus connector region 112 of primary bus card 111. The multiple bus processing element 110 includes a secondary bus connector 114 positioned within ISA slot 94C. A bridge cable conveys signals from the secondary bus connector 114 to a bridge cable connector 118 of primary bus card 111.

It should be appreciated at this point that the multiple bus processing element 110 advantageously exploits both the ISA slot 94C and the PCI slot 102A. As previously indicated, these two slots are called a "shared slot" because in the prior art only one card could be positioned in either the ISA slot 94C or the PCI slot 102A.

In sum, the invention is able to exploit a bus slot that is otherwise unused. Moreover, the multiple bus processing element 110 processes signals from two buses and thereby provides a highly integrated and compact device that executes multiple functions that would otherwise be performed by multiple cards.

Figure 5:
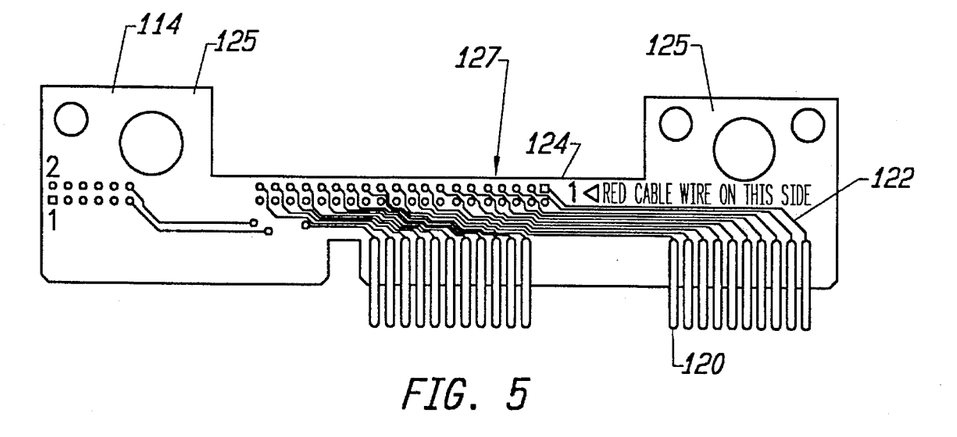
FIG. 5 is a front view of the secondary bus connector of the invention.
Figure 6:
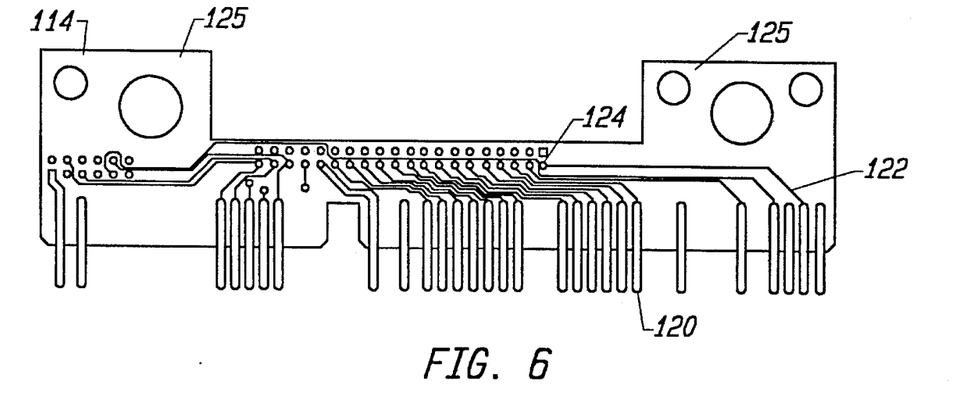
FIG. 6 is a rear view of the secondary bus connector of the invention.

The general nature and benefits of the invention have now been described. Attention presently turns to a more detailed consideration of one implementation of the invention. FIG. 5 illustrates the front side of the secondary bus connector 114. The connector 114 includes a set of secondary bus connector pins 120 for receiving signals from the secondary bus, in this case the ISA or ISA bus 60. Each secondary bus connector pin 120 is attached to a secondary bus trace 122 that leads to a secondary bus terminator 124. The bridge cable 116 is connected to the secondary bus terminators 124. FIG. 6 illustrates the back side of a secondary bus connector 114 implemented in accordance with the invention. FIG. 6 illustrates the secondary bus connector pins 120, secondary bus traces 120, and secondary bus terminators 124 of the device.

The secondary bus connector 114 shown in FIGS. 5 and 6 includes insertion flanges 125 for easy manual handling. It should also be noted in FIG. 4 that the vertical height of the secondary bus connector 114 is substantially equivalent to the vertical height of the interconnection slot 94C. This allows the secondary bus connector 114 and the primary bus card 111 to utilize both slots of the "shared slots" 94C and 102A. In one embodiment of the invention, each insertion flange 125 of the secondary bus connector 114 preferably has a vertical height between 1.0 and 1.5 inches, preferably approximately 1.25 inches. The recessed region 127 between insertion flanges 125 preferably has a vertical height between 0.35 inches and 0.75 inches, preferably approximately 0.55 inches.

Figure 7A:
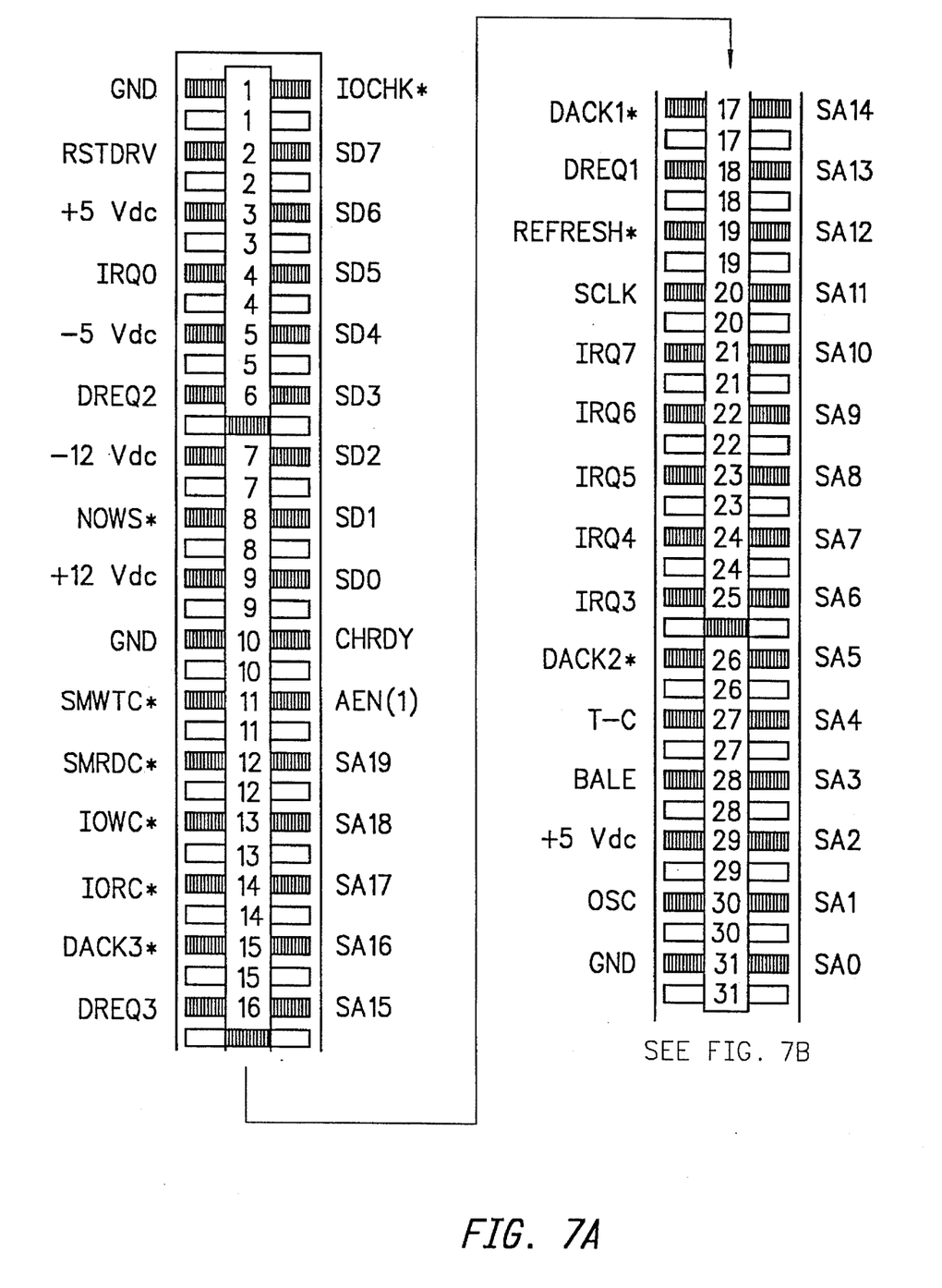
FIGS. 7A & 7B illustrate the pin assignments for an Industry Standard Architecture bus.
Figure 7B:
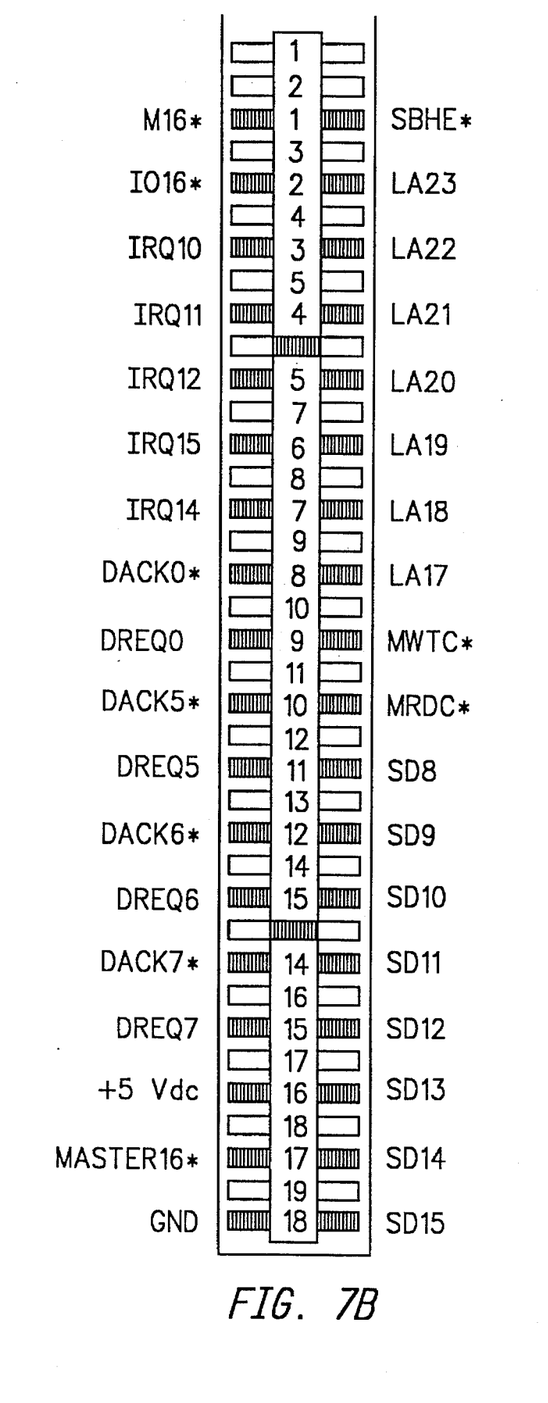

The secondary bus connector pins 120 of the secondary bus connector 114 are positioned within a standard ISA/EISA slot. FIG. 7 illustrates a standard ISA slot. An ISA slot has the same control signal designations, but 16 additional data lines. The individual signals associated with the ISA slot of FIG. 7 are known in the art. In the disclosed embodiment of the invention, only a subset of the signals from the ISA/EISA data bus are required, hence the secondary bus connector 114 does not include a secondary bus connector pin for each signal provided in the ISA/EISA slot of FIG. 7.

Figure 8:
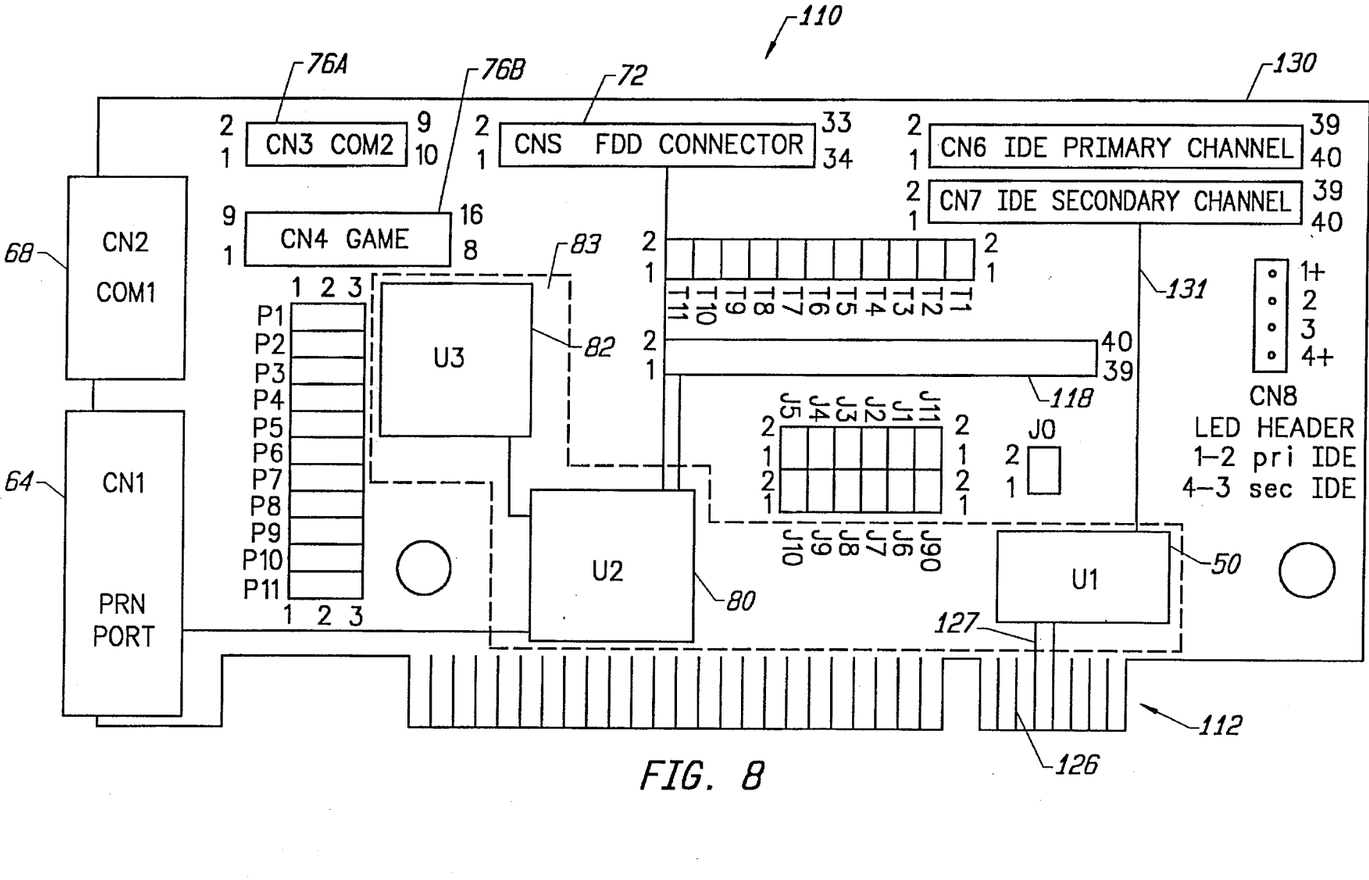
FIG. 8 illustrates the primary bus card of the invention.

FIG. 8 is a side view of the primary bus card 111 of the invention. The primary bus card 111 includes a primary bus connector region 112 that has a set of primary bus connector traces 126. The traces 126 are configured for connection to a primary bus slot. In the disclosed embodiment of the invention, a PCI slot is used. Appendix I defines the pin assignments for a PCI connector. The traces 126 are formed to match the designated pin assignments. Note that there are pin designations for each side of a card. Thus, the primary bus card 111 includes primary bus connector traces 126 on both sides of the device. Also note that the pin assignments are contingent upon whether the system is operating at 5 Volts or 3.3 Volts.

FIG. 8 also illustrates the bridge cable connector 118 that is used for electrical coupling with the bridge cable 116. The primary bus card 111 includes a parallel port connector 64, a serial port connector 68, a floppy disk drive connector 72, a supplemental serial port connector 76A, and a game board connector 76B.

The primary bus card 111 includes a hard disk drive controller 50. It should be appreciated that this processing element only uses signals from the PCI bus 42. In other words, the controller 50 has a set of signal traces 127 connected to the primary bus connector traces 126 to process signals to and from the PCI bus 42. In addition, the controller 50 uses signals from the disk drive connector 130. Line 131 is used to symbolize the set of lines between the disk drive connector 130 and the disk drive controller 50. The controller 50 has been implemented using a PCI IDE Chip, product number ICS00640B400, sold by CMD Corporation, Irvine, Calif.

The input/output operations of the parallel port controller 62, serial port controller 66, floppy controller 70, and additional controller devices 74, such as a game controller and a supplemental serial port controller, are performed by input/output chip 80. The super I/O chip, product number FDC37C666, sold by Standard Microsystems Corporation, Hauppauge, N.Y., may be used. The buffer chip 82 may be implemented by using the WAS3758P Buffer Chip sold by Winbond Corporation, Taiwan. For the sake of simplicity, FIG. 8 illustrates only some of the connecting lines between the input/output chip 80 and its electrically connected devices, such as bridge cable connector 118 and floppy disk drive controller 72. The input/output chip 80 only processes signals associated with the ISA/EISA bus 60, as received from the bridge cable connector 118.

The floppy controller portion of the input/output chip 80 requires the following signals from the ISA/EISA bus 60: IRQ6, DACK2*, TC, AEN, DATA (SD0–SD7), and ADDRESS (SA0–SA9). These signal ports are shown in the ISA connector of FIG. 7. The input/output chip 80 generates the following control signals in relation to its floppy control operations: DRQ2, IOR*, and IOW*. These signal definitions are known in the art.

The serial port controller portion of the input/output chip 80 requires the following signals from the ISA/EISA bus 60: IRQ3, IRQ4, AEN, DATA, and ADDRESS. The input/output chip 80 generates the following control signals in relation to its serial port control operations: IOW* and IOR*.

The parallel port controller portion of the input/output chip 80 requires the following signals from the ISA/EISA bus 60: IRQ5, IRQ7, AEN, SA10, DACK1*, DACK3*, DATA, and ADDRESS. The input/output chip 80 generates the following control signals in relation to its parallel port control operations: IOW*, IOR*, DRQ1, DRQ2, and IOCHRDY.

One of the N-device control operations associated with this embodiment of the invention is a game controller. The game controller portion of the input/output chip 80 requires the following signals from the ISA/EISA bus 60: AEN, DATA, and ADDRESS. The input/output chip 80 generates the following control signals in relation to its game control operations: IOW, and IOR*.

Another N-device control operation associated with this embodiment of the invention is a sound card controller. The sound controller portion of the input/output chip 80 requires the following signals from the ISA/EISA bus: IRQ5, IRQ7, IRQ9, IRQ10, IRQ11, IRQ12, AEN, DACK5*, DACK6*, DACK7*, DATA, and ADDRESS. The input/output chip 80 generates the following control signals in relation to its sound control operations: IOR*, IOW*, DRQ5, DRQ6, and DRQ7.

FIG. 8 also illustrates sets of jumpers P1–P11 and T1–T11 that may be configured in any manner.

The disclosed embodiment of the invention shown in FIG. 8 is for the purpose of illustration. It should be appreciated that other functions may be incorporated into the multiple bus processing element 110. An important aspect of the invention is the fact that a single processing element is used to process signals associated with two computer buses. In the disclosed embodiment of the invention, the interconnection structure to the secondary bus is in the form of the secondary bus connector 114, bridge cable 116, and bridge cable connector 118. The configuration of the apparatus of the invention permits both slots of a "shared slot" to be exploited. In the prior art, both slots cannot be used because there is not enough room for two full-sized cards. However, the secondary bus connector 114 has a height generally corresponding to the height of the secondary bus connector, thereby allowing both slots to be used. The invention also provides a lower cost device since a single card is performing the operations that would otherwise be performed by two cards.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, the operations of the circuits 50, 80 and 82 may be integrated into a single circuit 83. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

APPENDIX I
(PCI CONNECTOR PINOUT)

| Pin | 5 V System Environment Side B | 5 V System Environment Side A | 3.3 V System Environment Side B | 3.3 V System Environment Side A | Comments |
|---|---|---|---|---|---|
| 1 | −12 V | TRST# | −12 V | TRST# | 32-bit connector start |
| 2 | TCK | +12 V | TCK | +12 V | |
| 3 | Ground | TMS | Ground | TMS | |
| 4 | TDO | TDI | TDO | TDI | |
| 5 | +5 V | +5 V | +5 V | +5 V | |
| 6 | +5 V | INTA# | +5 V | INTA# | |
| 7 | INTB# | INTC# | INTB# | INTC# | |
| 8 | INTD# | +5 V | INTD# | +5 V | |
| 9 | PRSNT1# | Reserved | PRSNT1# | Reserved | |
| 10 | Reserved | +5 V$^{(I/O)}$ | Reserved | +3.3 V$^{(I/O)}$ | |
| 11 | PRSNT2# | Reserved | PRSNT2# | Reserved | |
| 12 | Ground | Ground | CONNECTOR KEY | | 3.3 volt key |
| 13 | Ground | Ground | CONNECTOR KEY | | 3.3 volt key |
| 14 | Reserved | Reserved | Reserved | Reserved | |
| 15 | Ground | RST# | Ground | RST# | |
| 16 | CLK | +5 V$^{(I/O)}$ | CLK | +3.3 V$^{(I/O)}$ | |
| 17 | Ground | GNT# | Ground | GNT# | |
| 18 | REQ# | Ground | REQ# | Ground | |
| 19 | +5 V$^{(I/O)}$ | Reserved | +3.3 V$^{(I/O)}$ | Reserved | |
| 20 | AD[31] | AD[30] | AD[31] | AD[30] | |
| 21 | AD[29] | +3.3 V | AD[29] | +3.3 V | |
| 22 | Ground | AD[28] | Ground | AD[28] | |
| 23 | AD[27] | AD[26] | AD[27] | AD[26] | |
| 24 | AD[25] | Ground | AD[25] | Ground | |
| 25 | +3.3 V | AD[24] | +3.3 V | AD[24] | |
| 26 | C/BE[3]# | IDSEL | C/BE[3]# | IDSEL | |
| 27 | AD[23] | +3.3 V | AD[23] | +3.3 V | |
| 28 | Ground | AD[22] | Ground | AD[22] | |
| 29 | AD[21] | AD[20] | AD[21] | AD[20] | |
| 30 | AD[19] | Ground | AD[19] | Ground | |
| 31 | +3.3 V | AD[18] | +3.3 V | AD[18] | |
| 32 | AD[17] | AD[16] | AD[17] | AD[16] | |
| 33 | C/BE[2]# | +3.3 V | C/BE[2]# | +3.3 V | |
| 34 | Ground | FRAME# | Ground | FRAME# | |
| 35 | IRDY# | Ground | IRDY# | Ground | |
| 36 | +3.3 V | TRDY# | +3.3 V | TRDY# | |
| 37 | DEVSEL# | Ground | DEVSEL# | Ground | |
| 38 | Ground | STOP# | Ground | STOP# | |
| 39 | LOCK# | +3.3 V | LOCK# | +3.3 V | |
| 40 | PERR# | SDONE | PERR# | SDONE | |
| 41 | +3.3 V | SBO# | +3.3 V | SBO# | |
| 42 | SERR# | Ground | SERR# | Ground | |
| 43 | +3.3 V | PAR | +3.3 V | PAR | |
| 44 | C/BE[1]# | AD[15] | C/BE[1]# | AD[15] | |
| 45 | AD[14] | +3.3 V | AD[14] | +3.3 V | |
| 46 | Ground | AD[13] | Ground | AD[13] | |
| 47 | AD[12] | AD[11] | AD[12] | AD[11] | |
| 48 | AD[10] | Ground | AD[10] | Ground | |
| 49 | Ground | AD[09] | Ground | AD[09] | |
| 50 | CONNECTOR KEY | | Ground | Ground | 5 volt key |
| 51 | CONNECTOR KEY | | Ground | Ground | 5 volt key |
| 52 | AD[08] | C/BE[0]# | AD[08] | C/BE[0]# | |
| 53 | AD[07] | +3.3 V | AD[07] | +3.3 V | |
| 54 | +3.3 V | AD[06] | +3.3 V | AD[06] | |
| 55 | AD[05] | AD[04] | AD[05] | AD[04] | |
| 56 | AD[03] | Ground | AD[03] | Ground | |
| 57 | Ground | AD[02] | Ground | AD[02] | |
| 58 | AD[01] | AD[00] | AD[01] | AD[00] | |
| 59 | +5 V$^{(I/O)}$ | +5 V$^{(I/O)}$ | +3.3 V$^{(I/O)}$ | +3.3 V$^{(I/O)}$ | |
| 60 | ACK64# | REQ64# | ACK64# | REQ64# | |
| 61 | +5 V | +5 V | +5 V | +5 V | |
| 62 | +5 V | +5 V | +5 V | +5 V | 32-bit connector end |
| | CONNECTOR KEY | | CONNECTOR KEY | | 64-bit spacer |
| | CONNECTOR KEY | | CONNECTOR KEY | | 64-bit spacer |
| 63 | Reserved | Ground | Reserved | Ground | 64-bit connector start |
| 64 | Ground | C/BE[7]# | Ground | C/BE[7]# | |
| 65 | C/BE[6]# | C/BE[5]# | C/BE[6]# | C/BE[5]# | |
| 66 | C/BE[4]# | +5 V$^{(I/O)}$ | C/BE[4]# | +3.3 V$^{(I/O)}$ | |
| 67 | Ground | PAR64 | Ground | PAR64 | |
| 68 | AD[63] | AD[62] | AD[63] | AD[62] | |
| 69 | AD[61] | Ground | AD[61] | Ground | |
| 70 | +5 V$^{(I/O)}$ | AD[60] | +3.3 V$^{(I/O)}$ | AD[60] | |
| 71 | AD[59] | AD[58] | AD[59] | AD[58] | |
| 72 | AD[57] | Ground | AD[57] | Ground | |
| 73 | Ground | AD[56] | Ground | AD[56] | |
| 74 | AD[55] | AD[54] | AD[55] | AD[54] | |
| 75 | AD[53] | +5 V$^{(I/O)}$ | AD[53] | +3.3 V$^{(I/O)}$ | |
| 76 | Ground | AD[52] | Ground | AD[52] | |
| 77 | AD[51] | AD[50] | AD[51] | AD[50] | |
| 78 | AD[49] | Ground | AD[49] | Ground | |
| 79 | +5 V$^{(I/O)}$ | AD[48] | +3.3 V$^{(I/O)}$ | AD[48] | |
| 80 | AD[47] | AD[46] | AD[47] | AD[46] | |
| 81 | AD[45] | Ground | AD[45] | Ground | |
| 82 | Ground | AD[44] | Ground | AD[44] | |

I claim:

1. An apparatus to process signals from a primary bus and a secondary bus of a computer, said apparatus comprising:

a primary bus card configured for simultaneous positioning within a computer backplane aperture and a first motherboard slot electrically connected to said primary bus, said primary bus card obtaining primary bus signals, said primary bus card including a processing circuit to process said primary bus signals, and a bridge cable connector electrically connected to said processing circuit;

a secondary bus connector configured for positioning within a second motherboard slot electrically connected to said secondary bus, said secondary bus connector obtaining multiple function secondary bus signals associated with multiple functions performed by a plurality of functional elements connected to said secondary bus, said secondary bus connector including a vertical profile substantially equivalent to the vertical profile of said second motherboard slot such that said secondary bus connector does not obstruct the positioning of said primary bus card within said computer backplane aperture; and a bridge cable vertically extending from said secondary bus connector to said bridge cable connector to convey said secondary bus signals to said processing circuit.

2. The apparatus of claim 1 wherein said processing circuit includes a hard drive controller circuit to process said primary bus signals.

3. The apparatus of claim 1 wherein said processing circuit includes a multiple function input/output circuit to process said secondary bus signals.

4. The apparatus of claim 3 wherein said multiple function input/output circuit includes a parallel port controller, a first serial port controller, and a floppy disk drive controller.

5. The apparatus of claim 4 wherein said multiple function input/output circuit further includes a game controller and a second serial port controller.

6. The apparatus of claim 1 wherein said first motherboard slot and said second motherboard slot share said computer backplane aperture.

7. The apparatus of claim 6 wherein said secondary bus connector includes an insertion flange.

8. An apparatus to process signals within a computer with a primary bus including a primary bus interconnection slot and a secondary bus including a secondary bus interconnection slot, said primary bus interconnection slot and said secondary bus interconnection slot being physically positioned so as to preclude the receipt of a processing card in both said primary bus interconnection slot and said secondary bus interconnection slot, said apparatus comprising:

a primary bus card including
      a primary bus connector region for connection with said primary bus interconnection slot to obtain primary bus signals,
      a processing circuit electrically connected to said primary bus connector region to process said primary bus signals, and
      a bridge cable connector electrically connected to said processing circuit;
   a secondary bus connector positionable within said secondary bus interconnection slot, said secondary bus connector having a vertical height substantially equivalent to the vertical height of said secondary bus interconnection slot to enable said secondary bus connector to be positioned next to said primary bus card; and
   a bridge cable vertically extending from said secondary bus connector to said bridge cable connector to convey said secondary bus signals to said processing circuit.

9. The apparatus of claim 8 wherein said primary bus interconenction slot is connected to a Peripheral Component Interconnect bus.

10. The apparatus of claim 8 wherein said secondary bus interconnection slot is connected to an Industry Standard Architecture bus.

11. The apparatus of claim 8 wherein said processing circuit includes a hard drive controller circuit to process said primary bus signals.

12. The apparatus of claim 8 wherein said processing circuit includes a multiple function input/output circuit to process said secondary bus signals.

13. The apparatus of claim 12 wherein said multiple function input/output circuit includes a parallel port controller, a first serial port controller, and a floppy disk drive controller.

14. The apparatus of claim 13 wherein said multiple function input/output circuit further includes a game controller and a second serial port controller.

15. The apparatus of claim 8 Wherein said secondary bus connector includes an insertion flange.

16. The apparatus of claim 8 wherein said primary bus card includes a parallel port connector and a serial port connector positionable through a backplane aperture of said computer.

17. The apparatus of claim 16 wherein said backplane aperture is shared by said primary bus interconnection slot and said secondary bus interconnection slot.

18. A method of configuring a computer of the type that includes a primary bus including a primary bus interconnection slot and a secondary bus including a secondary bus interconnection slot, said primary bus interconnection slot and said secondary bus interconnection slot being physically positioned so as to preclude the receipt of a processing card in both said primary bus interconnection slot and said secondary bus interconnection slot, said method comprising the steps of:

inserting a primary bus card into said primary bus interconnection slot, said primary bus card including a processing circuit to process primary bus signals from said primary bus;
   installing a secondary bus connector within said secondary bus interconnection slot, said secondary bus connector having a vertical height substantially equivalent to the vertical height of said secondary bus interconnection slot to enable said secondary bus connector to be positioned next to said primary bus card; and
   connecting said primary bus card to said secondary bus connector with a vertically extending bridge cable so that secondary bus signals of said secondary bus are conveyed to said processing circuit of said primary bus card.

19. The method of claim 18 wherein said installing step includes the step of using an insertion flange to connect said secondary bus connector with said secondary bus interconnection slot.

20. The method of claim 18 wherein said inserting step includes the step of positioning an external connector of said primary bus card through a backplane aperture of said computer.

* * * * *